US012734855B2

(12) United States Patent
Adamovsky et al.

(10) Patent No.: US 12,734,855 B2
(45) Date of Patent: Sep. 15, 2026

(54) DUAL RATE VEHICLE SUSPENSION SYSTEM WITH ADJUSTABLE RIDE HEIGHT

(71) Applicant: Multimatic Inc., Markham (CA)

(72) Inventors: Michael Francis Anthony Adamovsky, Thornhill (CA); Laurence J. Holt, Goodwood (CA)

(73) Assignee: Multimatic Inc., Markham (CA)

( * ) Notice: Subject to any disclaimer, the term of this patent is extended or adjusted under 35 U.S.C. 154(b) by 604 days.

(21) Appl. No.: 18/022,021

(22) PCT Filed: Aug. 21, 2020

(86) PCT No.: PCT/US2020/047352
§ 371 (c)(1),
(2) Date: Feb. 17, 2023

(87) PCT Pub. No.: WO2022/039752
PCT Pub. Date: Feb. 24, 2022

(65) Prior Publication Data

US 2023/0302862 A1 Sep. 28, 2023

(51) Int. Cl.
*B60G 15/06* (2006.01)
*B60G 17/005* (2006.01)

(52) U.S. Cl.
CPC ......... *B60G 15/065* (2013.01); *B60G 17/005* (2013.01); *B60G 2202/312* (2013.01);
(Continued)

(58) Field of Classification Search
CPC ...... B60G 3/20; B60G 15/065; B60G 17/005; B60G 17/021; B60G 17/0272;
(Continued)

(56) References Cited

U.S. PATENT DOCUMENTS 3,603,610 A 9/1971 Thompson
5,096,168 A * 3/1992 Takehara ............... F16F 9/185 267/152

(Continued)

FOREIGN PATENT DOCUMENTS

CN 109866571 A 6/2019
EP 2924315 A1 9/2015

(Continued)

OTHER PUBLICATIONS

Chinese Office Action for Chinese Application No. 202080103347.2 mailed Mar. 31, 2025.

(Continued)

*Primary Examiner* — Robert A. Siconolfi
*Assistant Examiner* — San M Aung
(74) *Attorney, Agent, or Firm* — Carlson, Gaskey & Olds, P.C.

(57) ABSTRACT

A spring configuration comprises a cylindrical damper (5), a primary coil spring (9) with a first predetermined spring rate K1, and a secondary coil spring (11) with a second predetermined spring rate K2, the coil springs arranged about the cylindrical damper (5) in series so as to provide a total combined spring rate KT, an actuator (20) configured to compress and decompress the coil springs (9, 11), a stop (12) configured to deactivate the secondary coil spring (11) at a stop position, such that, when the system is in a first, comfort, mode, the overall suspension spring rate is defined by the series equation 1/KT=1/K1+1/K2, and when the system is in a second, handling, mode, the overall vehicle suspension spring rate is defined by the series equation KT=K1, thus selectively and switchably providing both a low rate, optimal ride comfort setting and a high rate, optimal handling lower ride height setting.

12 Claims, 10 Drawing Sheets

(52) U.S. Cl.
CPC .................. *B60G 2202/413* (2013.01); *B60G 2204/4605* (2013.01); *B60G 2204/62* (2013.01); *B60G 2500/30* (2013.01)

(58) Field of Classification Search
CPC .......... B60G 2200/144; B60G 2200/44; B60G 2202/12; B60G 2202/24; B60G 2202/312; B60G 2202/413; B60G 2204/62; B60G 2204/4604; B60G 2204/4605; B60G 2500/20; B60G 2500/22; B60G 2500/30
USPC .......................................................... 267/221
See application file for complete search history.

(56) References Cited

U.S. PATENT DOCUMENTS

| | | | | |
|---|---|---|---|---|
| 5,183,285 | A | 2/1993 | Bianchi | |
| 5,263,695 | A * | 11/1993 | Bianchi | B60G 11/14 267/225 |
| 9,162,548 | B1 | 10/2015 | Wakeman | |
| 9,821,621 | B2 * | 11/2017 | Mason | B60G 17/0272 |
| 2002/0038929 | A1 * | 4/2002 | Now | B60G 17/021 267/217 |
| 2006/0175787 | A1 * | 8/2006 | Munster | H02K 7/06 280/124.145 |
| 2009/0108546 | A1 * | 4/2009 | Ohletz | B60G 15/063 280/124.179 |
| 2009/0302559 | A1 | 12/2009 | Doerfel | |
| 2012/0286493 | A1 * | 11/2012 | Butlin, Jr. | B60G 3/20 188/297 |
| 2019/0263209 | A1 * | 8/2019 | Harrison | F16F 3/04 |
| 2020/0070612 | A1 * | 3/2020 | Lee | B60G 15/065 |

FOREIGN PATENT DOCUMENTS

| | | | |
|---|---|---|---|
| FR | 1432820 | A | 3/1966 |
| JP | H04131531 | A | 5/1992 |
| JP | 2005106256 | A | 4/2005 |
| JP | 2007120642 | A | 5/2007 |
| WO | 2011149579 | A1 | 12/2011 |

OTHER PUBLICATIONS

International Search Report and Written Opinion for International Application No. PCT/US2020/047352 mailed May 18, 2021.
International Preliminary Report on Patentability for International Application No. PCT/US2020/047352 mailed Nov. 16, 2022.
Japanese Office Action for Japanese Application No. 2023-512382 mailed Apr. 2, 2024.
Mexican Office Action for Mexican Application No. MX/a/2023/002129 mailed Nov. 11, 2025. .

* cited by examiner 15
9
13
11
17
19
7
20

25
27
41
5
39
39
39
49
47
39
39
43
45
9
11

15
9
41
25
11

15
9
25
11
17
7
21
41
7

DUAL RATE VEHICLE SUSPENSION SYSTEM WITH ADJUSTABLE RIDE HEIGHT

BACKGROUND OF THE INVENTION

This invention relates to a suspension system for wheeled vehicles and, specifically, to a suspension system that offers two distinct modes of operation. To overcome the inherent compromise that must be made between optimizing the ride comfort and optimizing the handling capability of a road vehicle, this invention provides a dual mode suspension system in which the rate of the primary road spring can be switched between an optimal handling setting and an optimal ride setting.

The basic premise of motor vehicle suspension is to allow the wheels of a vehicle to independently travel up and over road disturbances such as bumps rather than having the entire vehicle and its occupants so travel. When passengers are not directly subjected to the effect of road disturbance, the ride comfort of the passengers is significantly enhanced. A substantial energy saving is also realized by simply moving a wheel instead of an entire vehicle over a road disturbance. In addition, the vehicle steering control is significantly enhanced with increasing speed since the entire vehicle mass is not pitched around over road disturbances.

Although vehicle suspension can be configured in many ways, it is generally arranged so as to isolate the main vehicle body, which is referred to as the "sprung mass", from the wheel systems, which are referred to as the "unsprung masses", using an energy storage medium, normally a spring of some type. The spring stores energy as the wheel system, which includes a hub, brake and motion control linkage, is allowed to move relative to the main vehicle body in response to road disturbances. Once a disturbance has been passed, the spring then releases its stored energy to return the wheel system back to its undisturbed state. To avoid an uncontrolled oscillatory response in a simple spring-mass system, some form of damping device is employed. Typically, a hydraulic based component generates a force proportional to velocity to provide a resistive force in both directions of spring motion to help the spring to return to zero velocity at its undisturbed position. This damper is a secondary component which does not support the weight of the vehicle.

As the limits of a vehicle's dynamic response are approached, the suspension system, which includes the motion control linkages and the energy storage and damper components, becomes a constraining factor in reaching optimal performance levels. If the springs and dampers are tuned relatively softly, in the interest of providing a high level of occupant isolation from road disturbances, then the sprung mass tends to move excessively in response to the lateral and longitudinal forces generated by the steering, accelerating and braking demands of the driver. These demands result in what is generally referred to as "handling response" while the quality of the occupant isolation is termed "ride response".

By changing the spring rates and damping coefficients at each of the four wheel corners, the ride and handling performance of the vehicle may be optimized. Generally, a stiffer spring rate, measured in force per unit displacement, returns a firmer ride and superior vehicle body control, whereas a softer spring rate provides a softer ride but less control. The damping coefficients are normally directly tuned to their related spring rates. Unfortunately, the optimal ride response occurs with lower spring rates and the optimal handling response occurs with higher spring rates. This has historically resulted in vehicles being tuned to a compromise of ride and handling responses.

There are numerous adaptive and manual dual rate suspension systems described in the art. Until recently, however, none were capable of providing the required characteristic of a performance vehicle using metallic energy storage devices such as coil, leaf or torsion springs.

A selectively switchable, dual rate suspension system is described in PCT/US2017/012588 to Holt et al. A pushrod activated inboard spring configuration comprises a torsion bar and a coil spring in series, each with its own spring rate. A lockout actuator is arranged in parallel with the coil spring. In a first mode, the coil spring is allowed to move freely so that the overall spring rate has contributions from both the torsion bar and the coil spring rates. In a second lockout mode, motion of the coil spring is prevented thus changing the overall spring rate to that of the torsion bar. This selectively provides both a low rate, optimal ride height comfort setting and a high rate, lower ride height optimal handling setting. Although this selectively switchable dual rate suspension system is extremely effective, its employment of a pushrod configuration limits its use to generally very high performance vehicles. Thus, there is a need for a selectively switchable, dual rate suspension system which can be used in a broader range of automotive vehicles.

Several attempts have been made to design a more generally applicable dual rate suspension system. None of them, however, are active, selectively switchable systems which provide for lower ride height in a high spring rate, optimal handling mode. For example, US 2009/0302559 to Doerfel describes a non-manually adjustable structure with two coil springs arranged about a strut. The spring assembly has a master spring, a slide, a stop and at least one auxiliary spring connected in series with the master spring. During compression of the spring assembly, when the auxiliary spring is compressed to a predetermined point, the stop contacts the slide to prevent further compression of the auxiliary spring. An alternative arrangement with the springs connected in parallel is also described. U.S. Pat. No. 9,162,548 to Wakeman and U.S. Pat. No. 9,821,621 to Mason describe similar structures. Neither involves a complete lockout of one spring. Mason generally seeks to maintain ride height while Wakeman allows ride height to be raised from an unloaded or neutral state, but not lowered. Neither provides a means to lower ride height in a high spring rate, optimal handling mode.

SUMMARY OF THE INVENTION

In a principal aspect of the invention, a selectively switchable dual rate vehicle suspension system comprises a spring configuration conventionally oriented between the unsprung mass and the sprung mass of one corner of the vehicle, comprising a cylindrical damper, a primary coil spring with a first predetermined spring rate K1, and a secondary coil spring with a second predetermined spring rate K2, the coil springs arranged about the cylindrical damper in series so as to provide a total combined spring rate KT, an actuator configured to compress and decompress the coil springs, a stop configured to deactivate the secondary coil spring at a stop position, such that, when the system is in a first, comfort, mode, the overall suspension spring rate is defined by the series equation $1/KT=1/K1+1/K2$, and when the system is in a second, handling, mode, the overall vehicle suspension spring rate is defined by the series equation $KT=K1$, thus selectively and switchably providing both a low rate, optimal ride comfort setting and a high rate, optimal handling lower ride height setting.

In a further aspect of the invention, the primary coil spring and the secondary coil spring are both connected to an intermediate spring abutment.

In a further aspect of the invention, the actuator acts on the secondary coil spring via a lower spring abutment.

In a further aspect of the invention, the actuator comprises a hydraulic cylinder and a hydraulic piston.

In a further aspect of the invention, the secondary coil spring is deactivated when decompressed.

In a further aspect of the invention, the intermediate spring abutment comprises a hydraulic cylinder with a hydraulic piston.

In a further aspect of the invention, the secondary coil spring is deactivated when compressed.

In a further aspect of the invention, the hydraulic cylinder rides on an outer wall of the cylindrical damper.

In a further aspect of the invention, the stop comprises a stop portion of the outer wall of the cylindrical damper against which a contact portion of the hydraulic cylinder abuts.

In a further aspect of the invention, the suspension system further comprises a lockout means configured to hold the secondary coil spring in the stop position.

In a further aspect of the invention, the suspension system further comprises a third, maneuvering, mode wherein the secondary coil spring is decompressed and the primary coil spring is raised to increase the ride height above the optimal ride comfort setting.

In a further aspect of the invention, the cylindrical damper provides adjustable damping to match changes in spring rate for optimal vehicle comfort and handling.

Figure 1B:
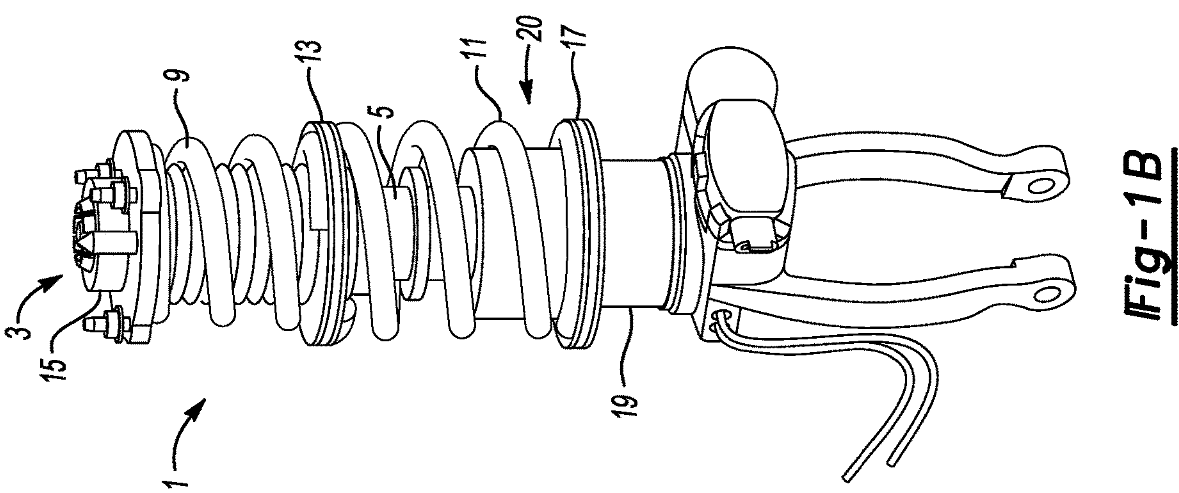
FIGS. 1B, 1C and 1D illustrate perspective isolated views of a front assembly single acting cylinder system from various angles.
Figure 1A:
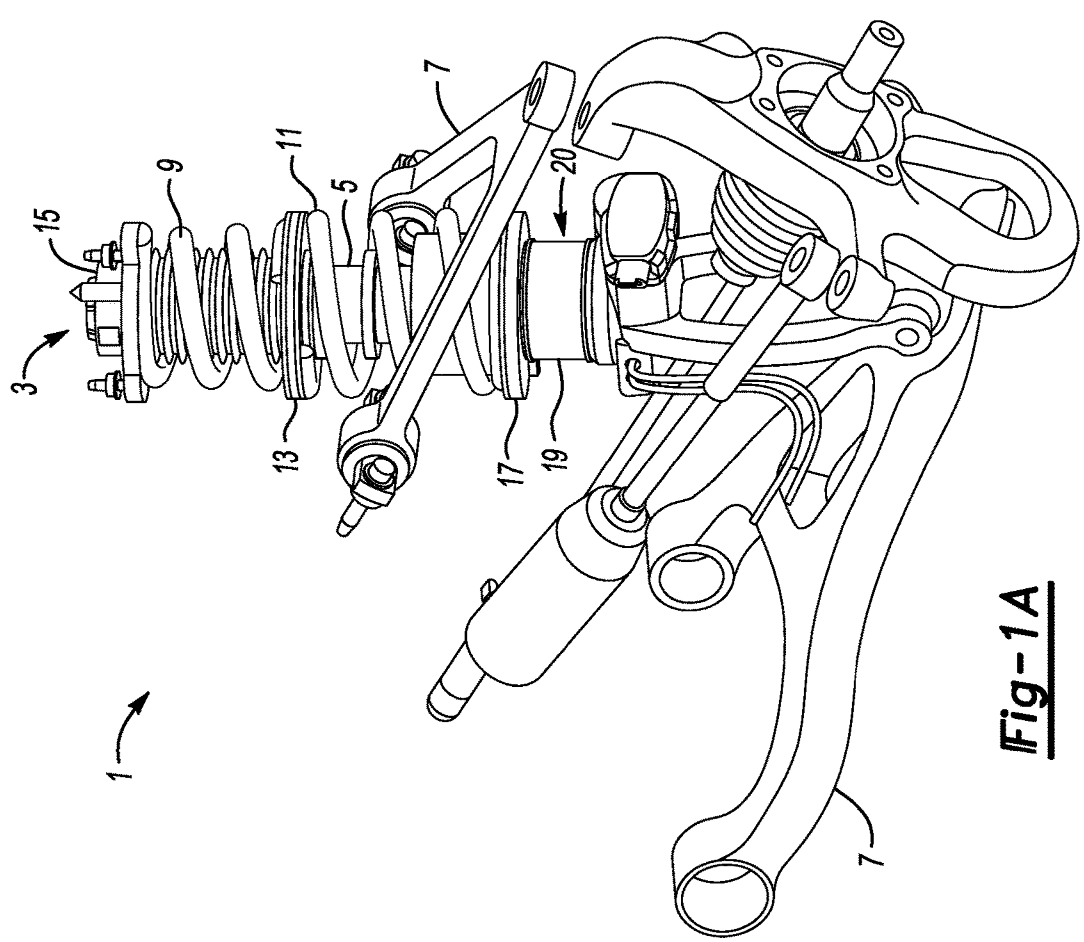
FIG. 1A illustrates a perspective view of a front assembly single action cylinder system mounted in a conventional double wishbone suspension system for use at one corner of a vehicle, typically at a front corner.
Figure 1D:
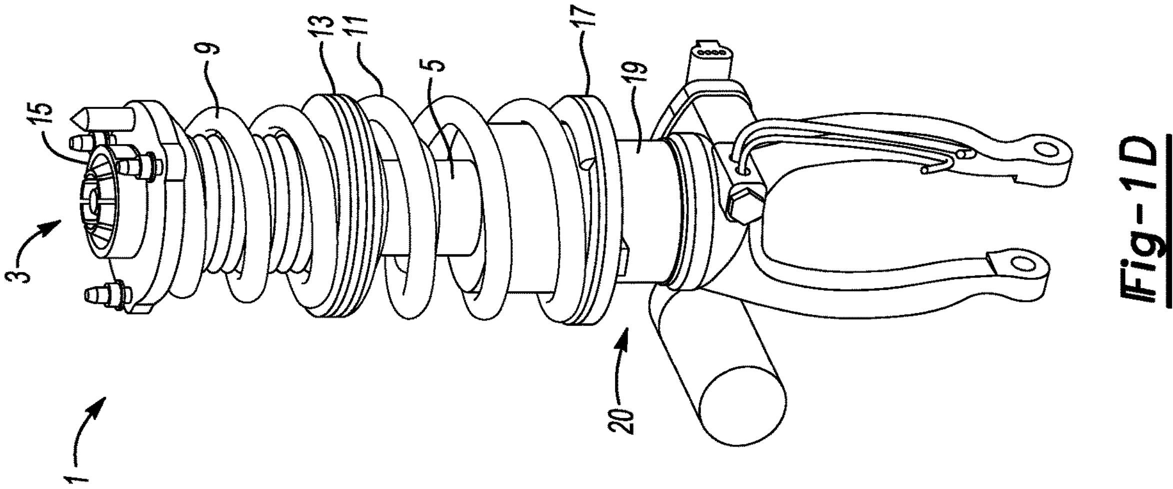
Figure 1C:
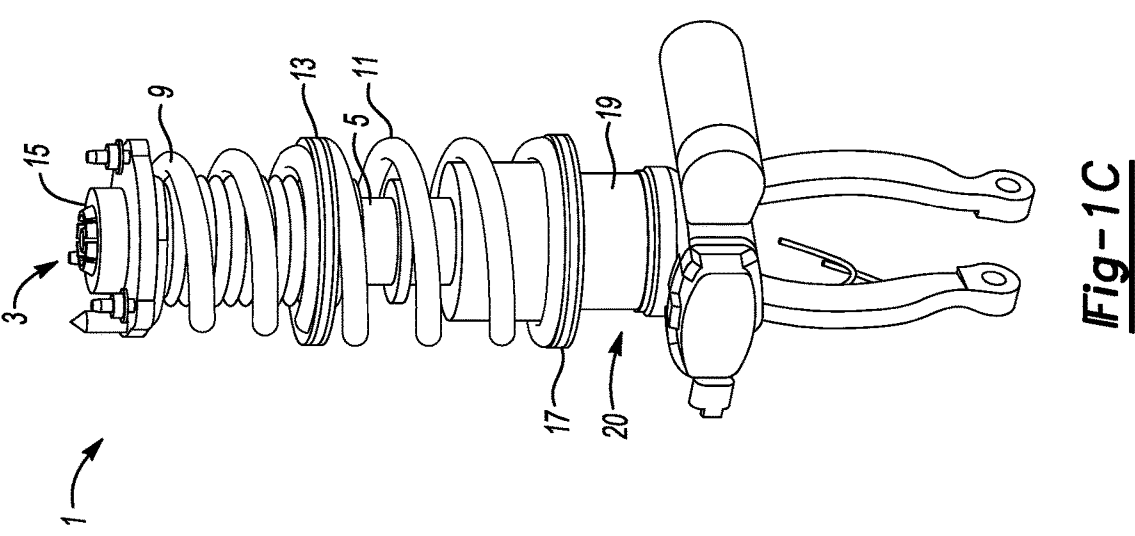
Figures 2A, 2B:
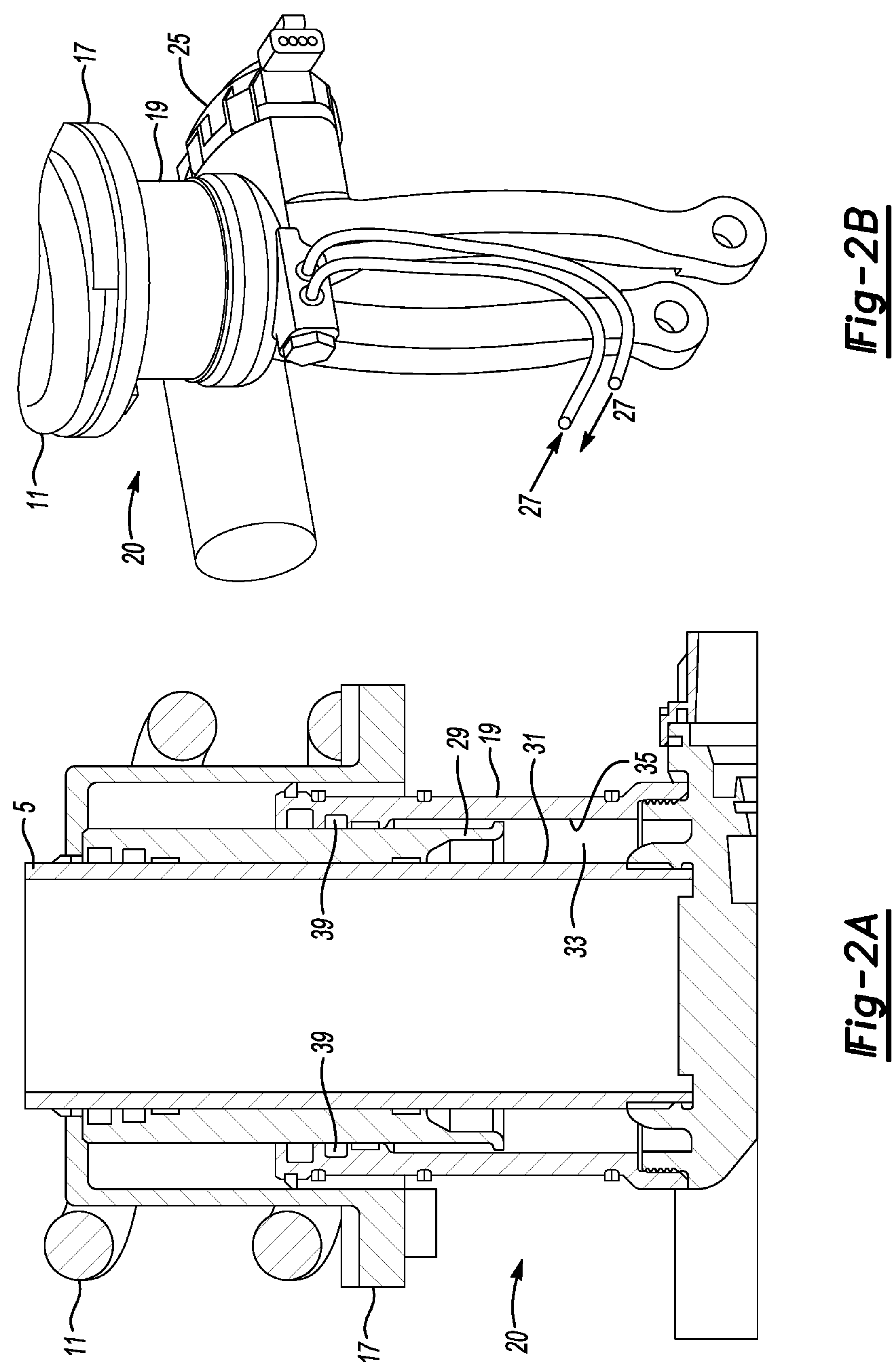
FIG. 2A illustrates an elevational cross-sectional view of a portion of the single acting cylinder system.
FIG. 2B Illustrates a perspective view of a portion of the single acting cylinder system and certain damper components.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

In a first embodiment, the suspension system 1 comprises a front assembly, single acting cylinder arrangement 3. A cylindrical damper 5, or strut, provides shock absorption in a conventional double wishbone 7 suspension system. Unlike a conventional strut arrangement with a single coil spring mounted coaxially about the strut, two coil springs, typically with different spring rates, are mounted coaxially in series about the cylindrical damper or strut 5. These are a primary coil spring 9 with a spring rate K1 and a secondary coil spring 11 with a spring rate K2. A common spring abutment 13 serves to connect the two coil springs 9, 11. The primary coil spring 9 is connected to, or abuts, a top mount 15 at the free end 16 of the strut 5. A lower spring abutment 17 is connected to, or abuts, the secondary coil spring 11 distal from the common spring abutment 13.

In a spring system comprising two springs connected in series, the combined spring rate KT is defined by the equation $1/KT=1/K1+1/K2$.

A hydraulic cylinder actuator 20 is mounted about the cylindrical damper 5 between the lower spring abutment 17 and the non-free end 21 of the cylindrical damper 5. Although a preferred hydraulic cylinder actuator is described, the actuator can comprise any suitable mechanism, including electrical, pneumatic or otherwise.

Figures 3A, 3B, 3C:
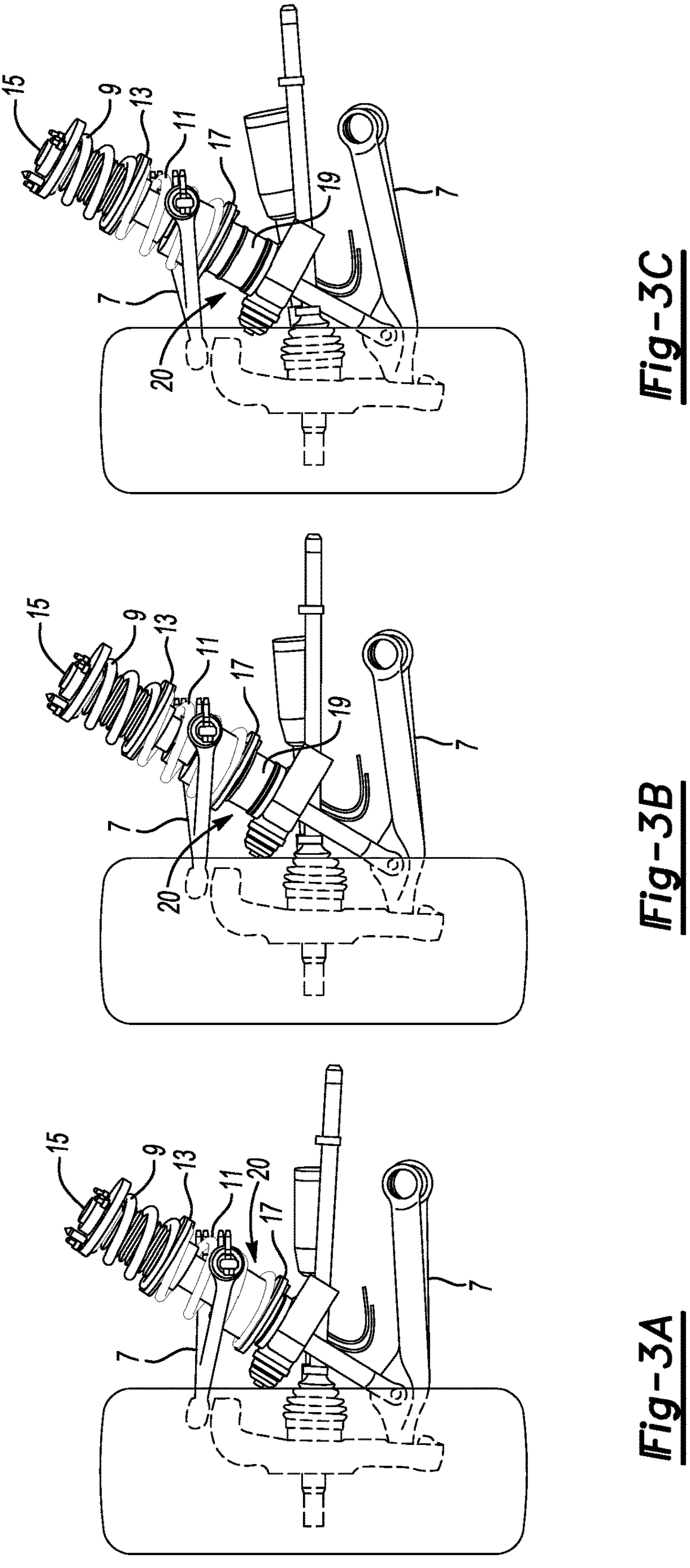
FIGS. 3A, 3B and 3C illustrate the front assembly single acting cylinder system in multiple elevational views mounted in a conventional double wishbone suspension system in lowered, trim and raised vehicle height configurations respectively.
Figures 4A, 4B:
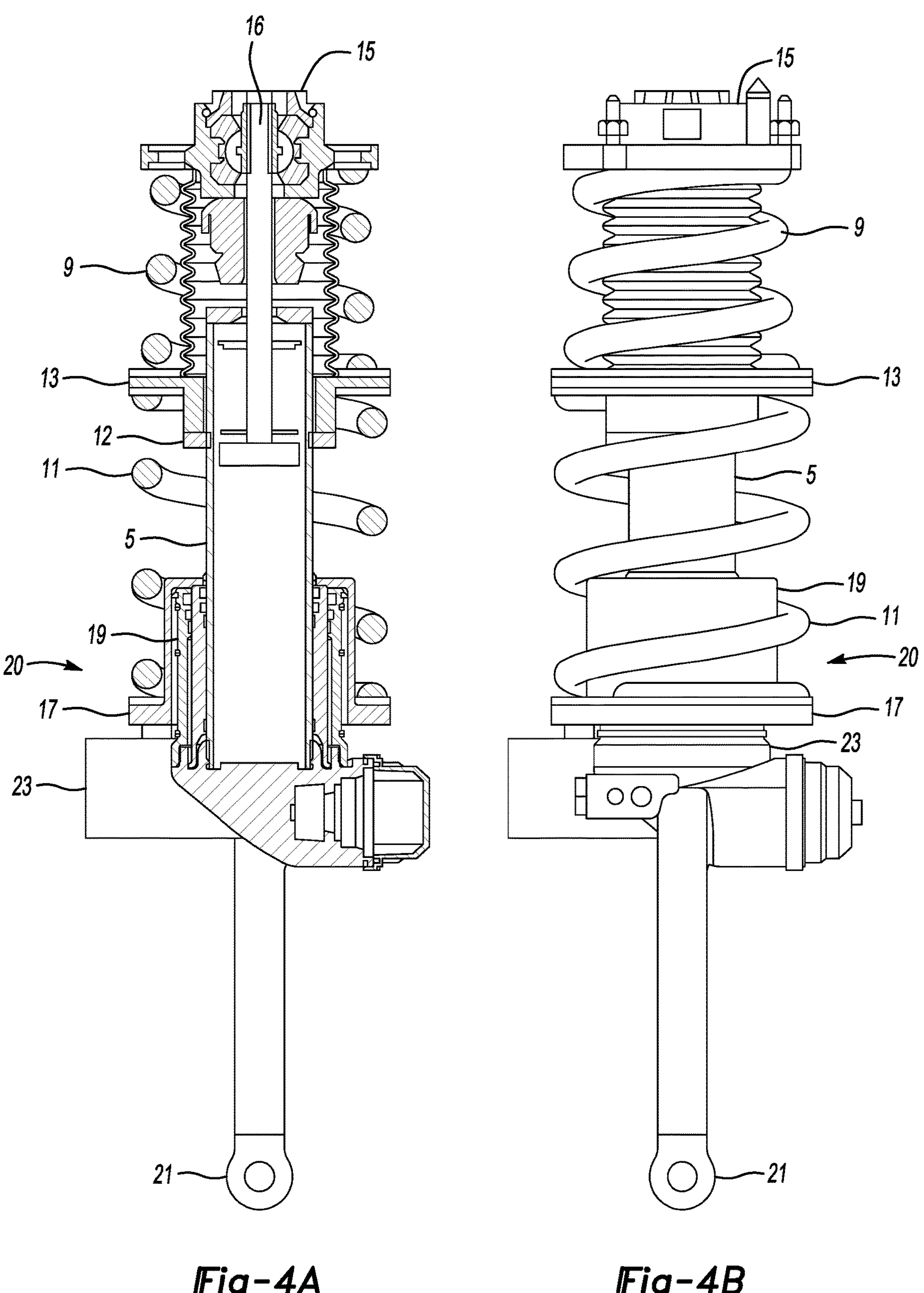
FIGS. 4A and 4B illustrate the front assembly single acting cylinder system in paired elevational cross-sectional and standard views of the system in a lowered vehicle height configuration.

When the secondary coil spring 11 is fully extended so that the lower spring abutment 17 rests on the suspension components 23 below, and the actuator 20 is retracted, the secondary spring 11 does not contribute to the overall spring rate KT. In this condition, the secondary spring rate K2 drops out of the equation so that the spring rate is defined as $1/KT=1/K1$. This corresponds to a stiffer suspension since the combined spring rate of the two springs in series is always lower than the single spring rate of either spring alone. It also corresponds to a lower ride height for optimal handling on road conditions such as a smooth highway or a race track. This lower ride height configuration is illustrated in FIGS. 3A, 4A and 4B.

Figures 4C, 4D:
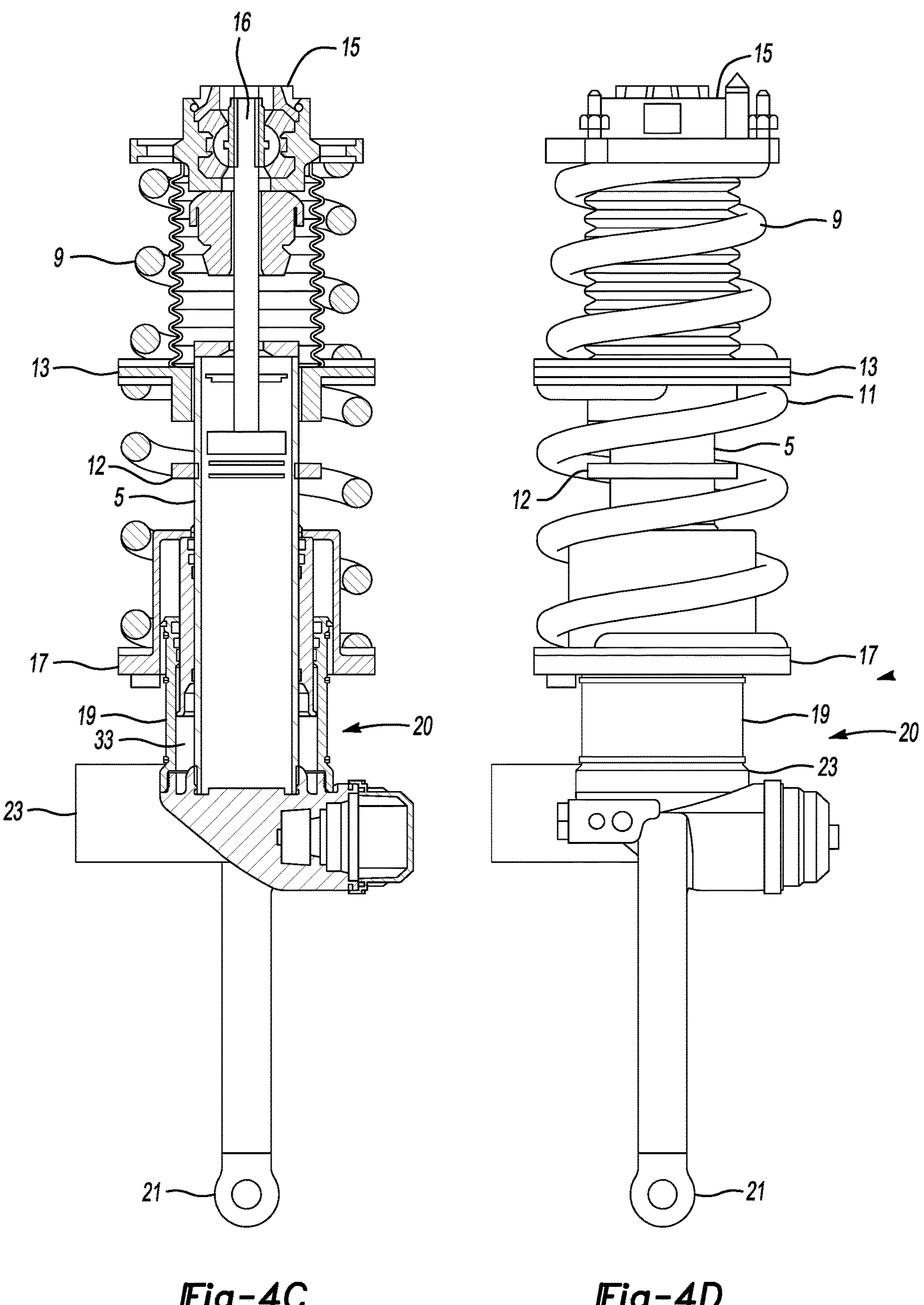
FIGS. 4C and 4D illustrate the front assembly single acting cylinder system in paired elevational cross-sectional and standard views of the system in a trim vehicle height configuration.

As the actuator 20 extends under hydraulic pressure, it compresses the secondary coil spring 11 until, at a certain point, the spring abutment 13 lifts off a spring stop 12 and the secondary coil spring 11 begins to contribute again to the overall spring rate according to the formula $1/KT=1/K1+1/K2$. This corresponds to a softer suspension for optimal ride comfort, typically best in bumpier road conditions. The ride height is also increased in this mode, which is preferable for vehicle clearance from the potentially bumpier road conditions. This comfort ride height, or trim mode, configuration is illustrated in FIGS. 3B, 4C and 4D.

For driving in normal variable road conditions, the optimal ride comfort setting and height, or trim mode, can be chosen by locking the actuator 20 at a certain position in relation to the cylindrical damper 5. In the illustrated hydraulic actuator 20, this is accomplished by closing a valve 25 to arrest hydraulic fluid flow 27 into and out of the actuator 20.

The actuator 20 may comprise the hydraulic cylinder 19 slideably sealed to a hydraulic piston 29 which in turn is slideably sealed to the outer wall of the cylindrical damper 5. The position of the hydraulic piston 29 is determined by the volume of hydraulic fluid in a hydraulic chamber 33 defined by the inner wall 35 of the hydraulic cylinder 19, the outer wall 31 of the cylindrical damper 5 and the piston 29. The piston 29 may contact the lower spring abutment 17 so that the hydraulic piston 29 and the lower spring abutment 17 reciprocate in tandem in relation to the cylindrical damper 5. As indicated previously, seals 39 prevent the escape of hydraulic fluid between these components while permitting relatively low friction reciprocating motion. The valve 25 may be closed to fix the volume of the hydraulic fluid in the hydraulic chamber 33 to lock the actuator 20 in position for the suspension system trim mode.

Figures 4E, 4F:
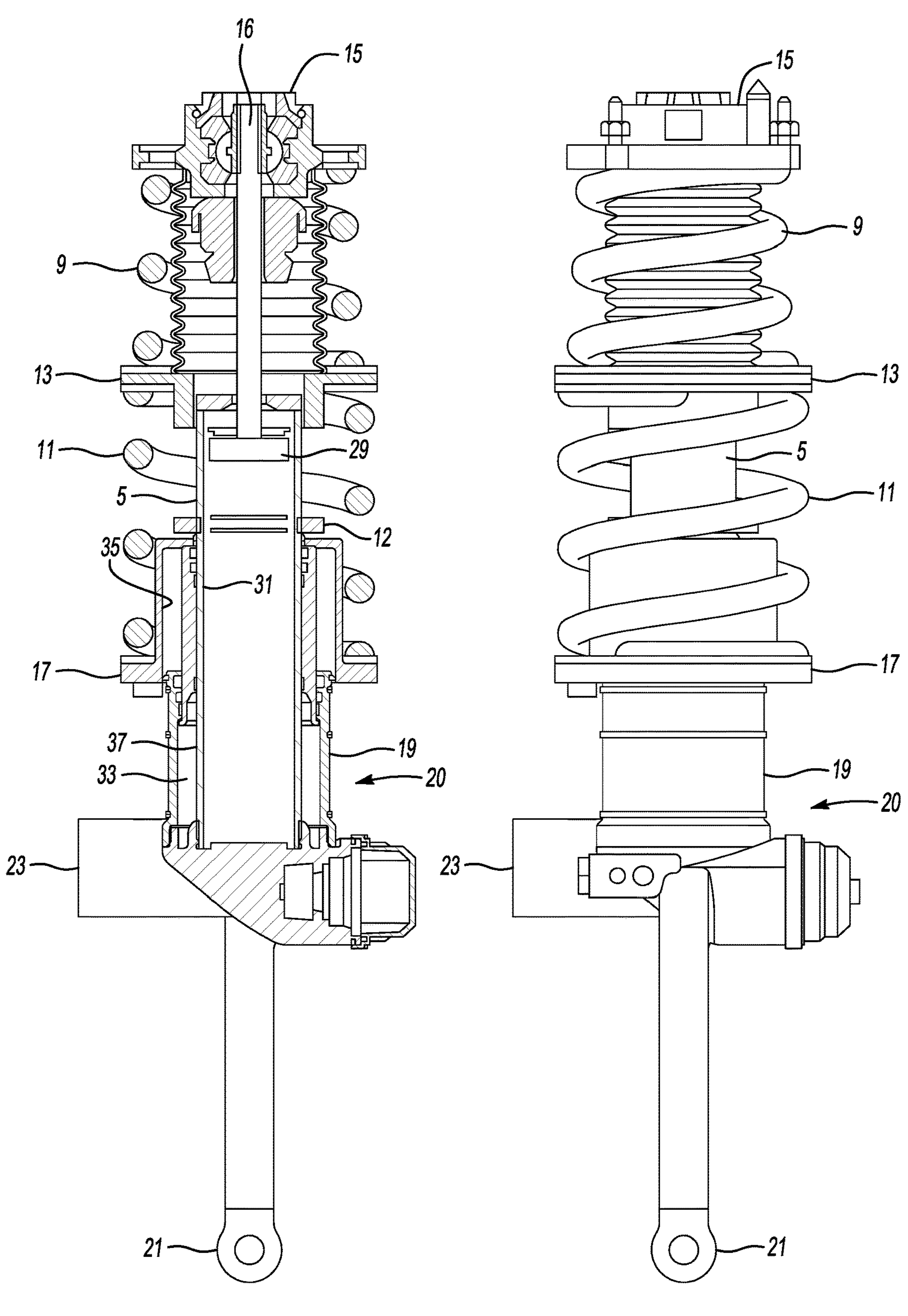
FIGS. 4E and 4F illustrate the front assembly single acting cylinder system in paired elevational cross-sectional and standard views of the system in a raised vehicle height configuration.
Figures 5A, 5B, 5C:
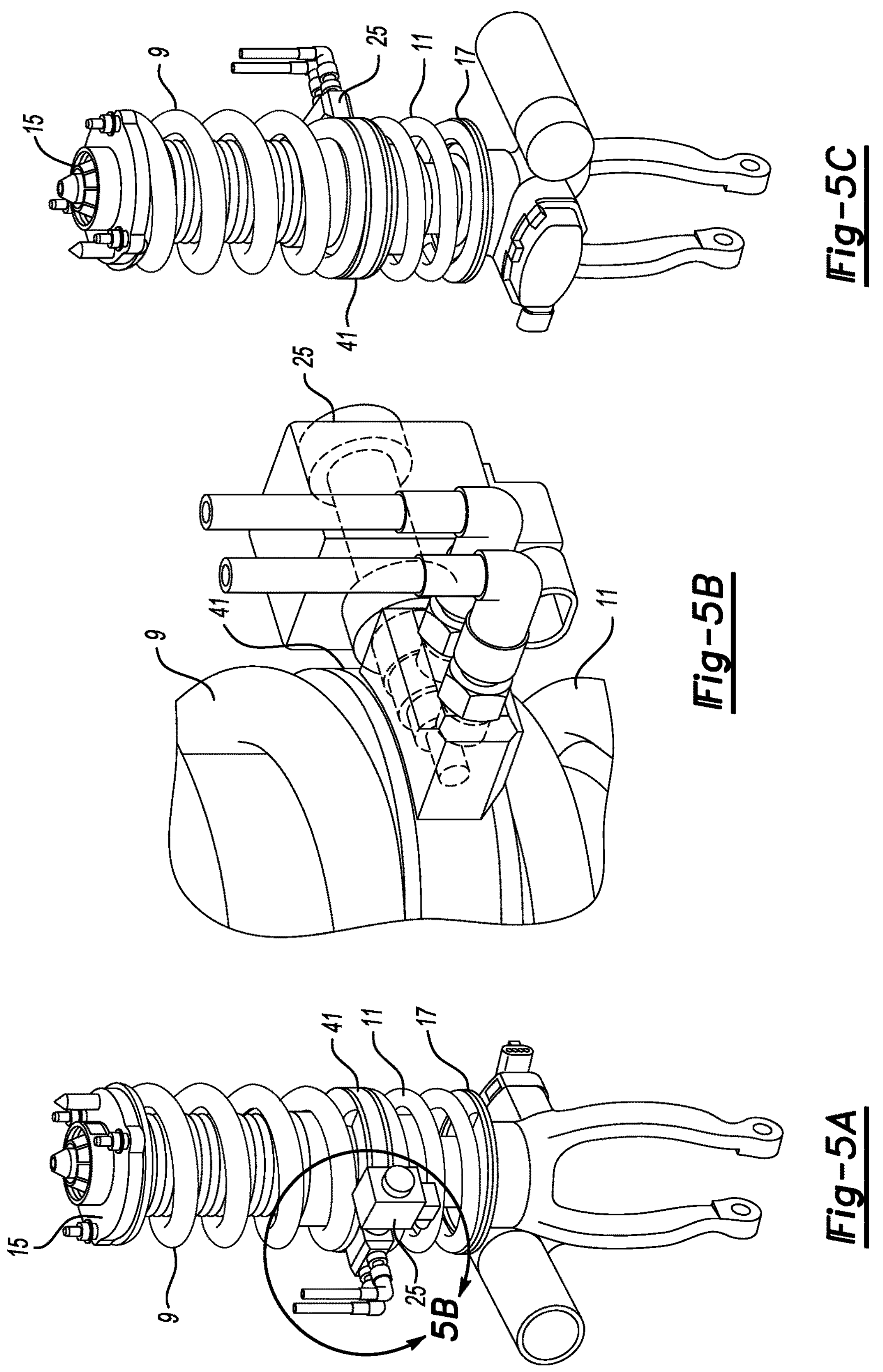
FIG. 5A illustrates an alternative front assembly dual acting cylinder system in a perspective isolated view.
FIG. 5B illustrates a partial expanded portion of the alternative front assembly dual acting cylinder system of FIG. 5A in a perspective isolated view.
FIG. 5C illustrates the alternative front assembly dual acting cylinder system of FIG. 5A from another angle.
Figure 6:
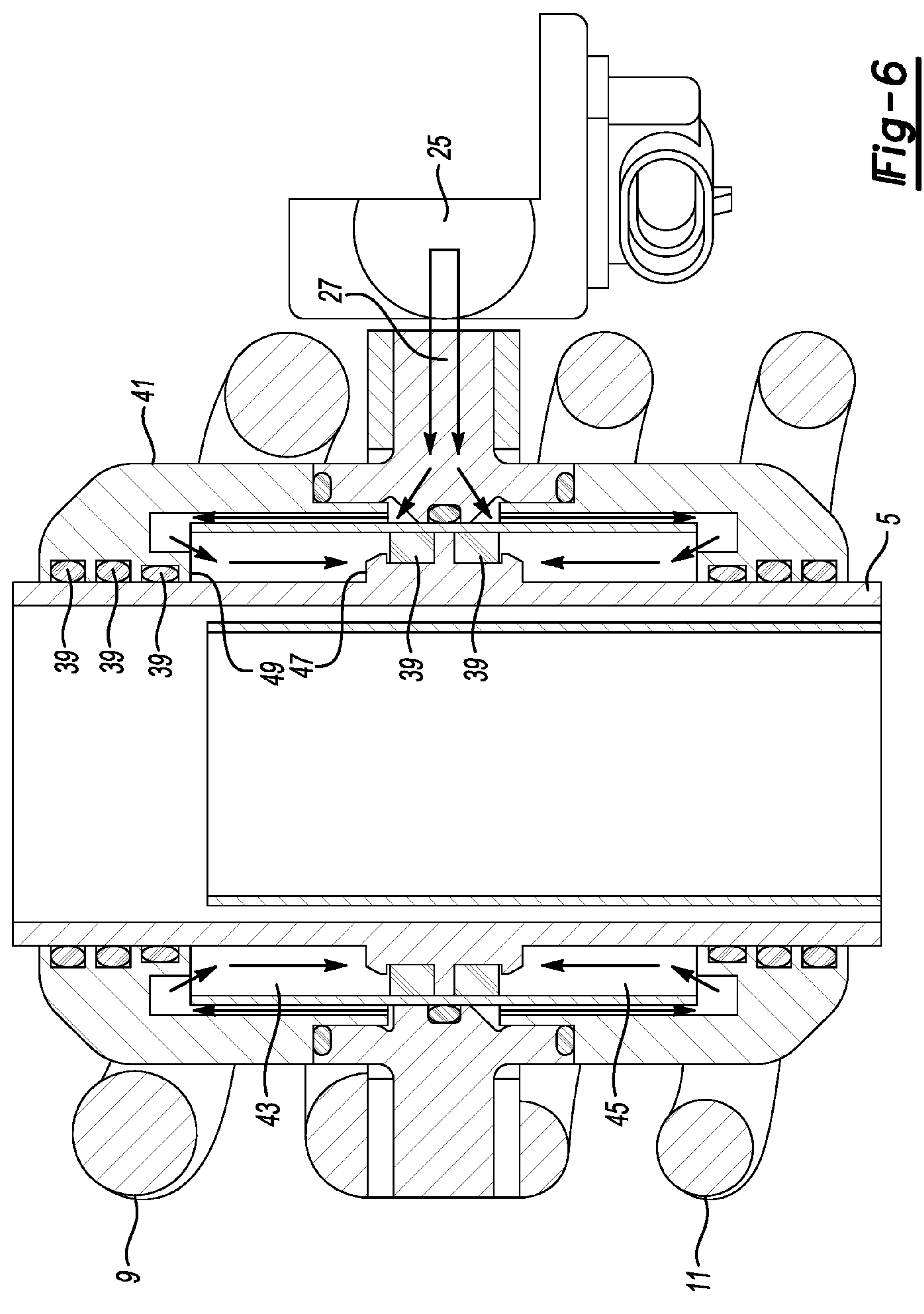
FIG. 6 illustrates an elevational cross-sectional view of a portion of the dual acting cylinder system.
Figures 7A, 7B:
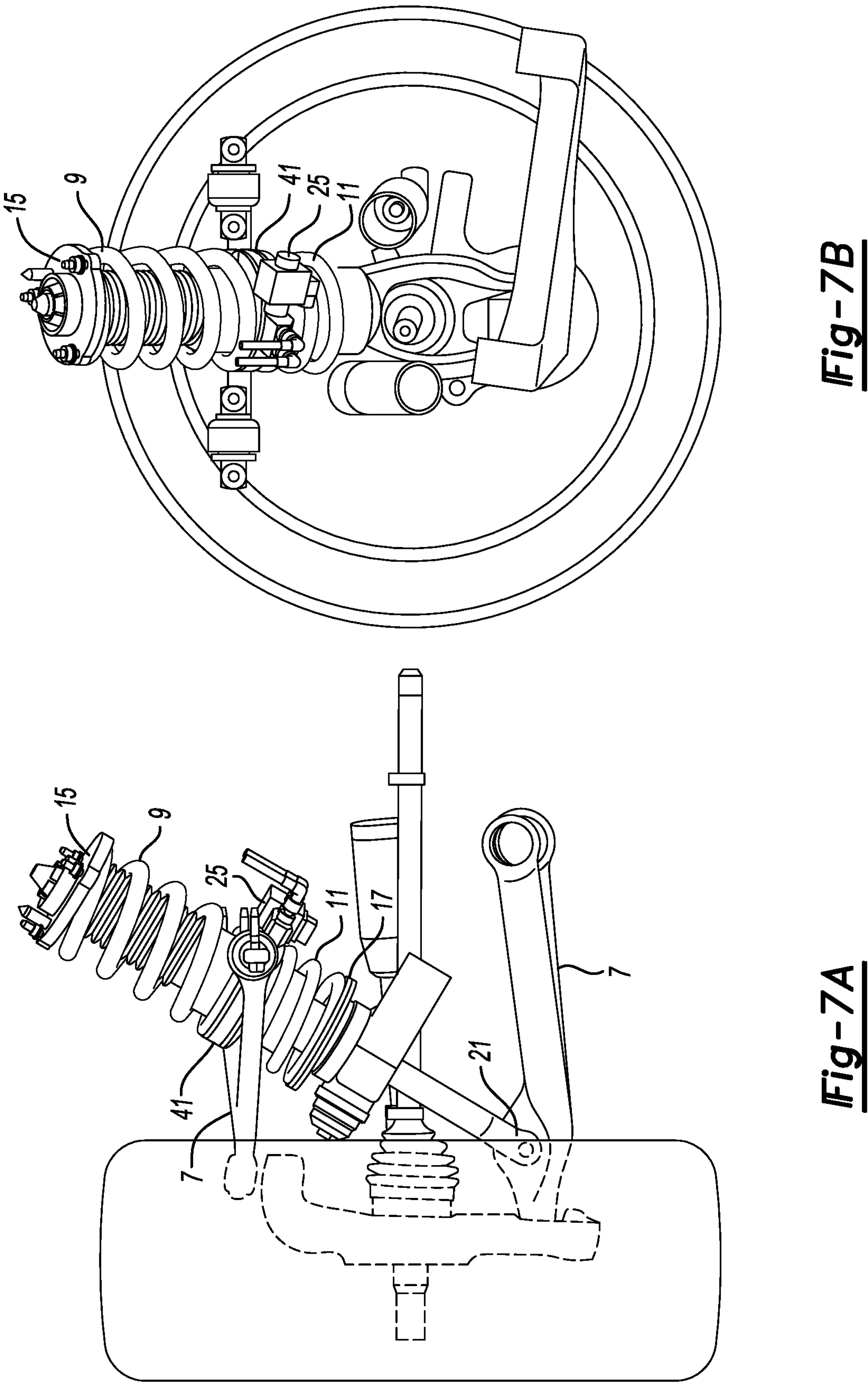
FIG. 7A illustrates an elevational view of the alternative front assembly dual acting cylinder system mounted in a conventional double wishbone suspension system.
FIG. 7B illustrates a perspective isolated view of the alternative front assembly dual acting cylinder system.

For certain vehicle maneuvering purposes, it is advantageous to raise the vehicle height even further. For example, if a vehicle must descend a steep driveway to enter a roadway, additional vehicle height may be beneficial to prevent contact of portions of the vehicle with the driveway or road surface. In this situation, the actuator 20 may be extended further to raise the front of the vehicle. The system in this extra raised position may be called the maneuvering mode as illustrated in FIGS. 3C, 4E and 4F. It is not intended that the vehicle be driven at any significant speed in the maneuvering mode, but it is a useful option for certain conditions.

In a second embodiment, as illustrated in FIGS. 5A-5C, 6 and 7A-7B, the system comprises a front assembly, dual acting cylinder arrangement. As in the first embodiment, the single acting cylinder arrangement, the suspension system of the second embodiment comprises a cylindrical damper 5 with primary and secondary coil springs 9, 11 connected in series and mounted coaxially about the cylindrical damper 5. In this embodiment, however, the spring abutment 13 connecting the coil springs 9, 11 also comprises a reciprocating hydraulic cylinder 41 which moves along the cylindrical damper 5. In addition, the secondary coil spring 11 is fixed at its distal end from the spring abutment 13, in relation to the suspension components 23 to which the cylindrical damper 5 is attached. Thus, the compression or decompression of the springs 9, 11 is generated from a position between the springs by the hydraulic cylinder 41.

The hydraulic cylinder 41 is mounted so as to reciprocate along a portion of the outer wall 37 of the cylindrical damper 5. Hydraulic chambers lie on either side of a piston between the hydraulic cylinder 41 and the outer wall 37 of the cylindrical damper 5. By supplying hydraulic fluid to one of the hydraulic chambers 43, 45, the hydraulic cylinder 41 is urged to move in one direction along the cylindrical damper 5. In the illustrated embodiment, increased hydraulic fluid pressure in the first hydraulic chamber 43 forces the hydraulic cylinder 41 to compress the primary coil spring 9 and raises the vehicle height. By contrast, increased hydraulic fluid pressure in the second hydraulic chamber 43 forces the hydraulic cylinder 41 to compress the secondary coil spring 11 and to lower the vehicle height. When the vehicle is sufficiently lowered, a valve 25 may be closed to stop further flow of hydraulic fluid in the hydraulic chambers 43, 45. This locks the hydraulic cylinder 41 in relation to the cylindrical damper 5 and, since it is constrained from moving, also locks out the secondary coil spring 11 from contributing to the overall spring rate KT. In this optimal handling mode, the overall spring rate KT equals the primary coil spring rate K1 and the spring rate is governed by the equation $1/KT=1/K1$.

When the valve 25 is opened and the secondary coil spring 11 is permitted to contribute again to the overall spring rate, the spring rate is again governed by the formula $1/KT=1/K1+1/K2$. In this trim mode, which is an optimal comfort mode, the hydraulic cylinder 41 moves freely longitudinally governed by the compression of the primary and secondary coil springs 9, 11, hydraulic fluid flows freely between the first and second hydraulic chambers 43, 45 and the ride height remains higher than in the optimal handling mode.

A wall stop 47 may be provided on the outer wall 37 of the cylindrical damper 5 to abut a contact portion 49 of the hydraulic cylinder 41. The contact portion 49 abuts the wall stop 47 when sufficient hydraulic fluid is forced into the first hydraulic chamber 43 which further raises the vehicle height. This raised height maneuvering mode can be maintained by closing the valve 25 to again stop the flow of hydraulic fluid between the first and second hydraulic chambers 43, 45.

It should be noted that an adjustable damping system is very beneficial for use in conjunction with the described suspension system to compensate for changes in spring rate and ride height.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:

1. A selectively switchable dual rate vehicle suspension system configured to be oriented between the unsprung mass and the sprung mass of one corner of a vehicle, comprising:

a cylindrical damper;

a primary coil spring with a first predetermined spring rate K1, and a secondary coil spring with a second predetermined spring rate K2, the coil springs both connected to a common spring abutment and arranged about the cylindrical damper in series so as to provide a total combined spring rate KT;

an actuator mounted to the damper and configured to compress and decompress the coil springs;

stop means configured to deactivate the secondary coil spring in at least one stop position;

such that, when the system is in a first mode the overall suspension spring rate is defined by the series equation 1/KT=1/K1+1/K2, and when the system is in a second mode the overall vehicle suspension spring rate is defined by the series equation 1/KT=1/K1, thus selectively and switchably providing both a low rate, optimal ride comfort setting in the first mode and a high rate, optimal handling lower ride height setting in the second mode.

2. The suspension system of claim 1, wherein the actuator comprises a hydraulic cylinder and a hydraulic piston.

3. The suspension system of claim 2, wherein the hydraulic cylinder rides on an outer wall of the cylindrical damper.

4. The suspension system of claim 3, wherein the stop means comprises a stop portion of the outer wall of the cylindrical damper against which a contact portion of the hydraulic cylinder abuts.

5. The suspension system of any one of claims 1 to 4, wherein the actuator acts on the secondary coil spring via a lower spring abutment.

6. The suspension system of claim 1, wherein the secondary coil spring is deactivated when decompressed.

7. The suspension system of claim 1, further comprising a third, maneuvering, mode wherein both the secondary coil spring and the primary coil spring are compressed beyond the first mode to increase a vehicle ride height above that in the first mode, optimal ride comfort setting.

8. The suspension system of any one of claims 1 to 3, wherein the actuator comprises the common spring abutment.

9. The suspension system of claim 8, wherein the stop means comprises a lockout means configured to hold the secondary coil spring in multiple selected stop positions.

10. The suspension system of claim 9, wherein the lockout means comprises valve means to inhibit flow of a hydraulic fluid in the hydraulic cylinder.

11. The suspension system of claim 1, further comprising a third, manoeuvering, mode wherein the secondary coil spring is decompressed and the primary coil spring is raised to increase a vehicle ride height above that in the first mode, optimal ride comfort setting.

12. The suspension system of claim 1, wherein the cylindrical damper provides adjustable damping to match changes in spring rate for optimal vehicle comfort and handling.

* * * * *